US010997314B1

(12) United States Patent
McCluskey et al.

(10) Patent No.: US 10,997,314 B1
(45) Date of Patent: *May 4, 2021

(54) SYSTEM AND METHOD FOR PERPETUAL REKEYING OF VARIOUS DATA COLUMNS WITH RESPECTIVE ENCRYPTION KEYS AND ON ALTERNATING BASES

(71) Applicant: Intuit Inc., Mountain View, CA (US)

(72) Inventors: Sean McCluskey, Redwood City, CA (US); Elangovan Shanmugam, Cupertino, CA (US); Narendra Dandekar, Dublin, CA (US); Rachit Lohani, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 16/386,912

(22) Filed: Apr. 17, 2019

Related U.S. Application Data

(63) Continuation of application No. 15/410,280, filed on Jan. 19, 2017, now Pat. No. 10,303,895.

(51) Int. Cl.
| G06F 21/00 | (2013.01) |
| G06F 21/62 | (2013.01) |
| G06Q 40/00 | (2012.01) |
| G06F 21/60 | (2013.01) |
| H04L 9/08 | (2006.01) |
| H04L 9/14 | (2006.01) |

(52) U.S. Cl.
CPC ........ G06F 21/6245 (2013.01); G06F 21/602 (2013.01); G06Q 40/123 (2013.12); G06Q 40/125 (2013.12); H04L 9/0861 (2013.01); H04L 9/14 (2013.01)

(58) Field of Classification Search
CPC . G06F 21/6245; G06F 21/602; G06Q 40/123; G06Q 40/125; H04L 9/0861; H04L 9/14; H04L 9/16
See application file for complete search history.

(56) References Cited

U.S. PATENT DOCUMENTS

| 5,724,584 | A | 3/1998 | Peters et al. |
| 5,893,902 | A | 4/1999 | Transue et al. |
| 6,408,336 | B1 | 6/2002 | Schneider et al. |
| 6,442,092 | B1 | 9/2002 | Sutter |

(Continued)

FOREIGN PATENT DOCUMENTS

| JP | 2004-259196 | 9/2004 |
| WO | WO 03/096250 | 11/2003 |
| WO | WO 2015/012991 | 1/2015 |

OTHER PUBLICATIONS

"Screen Scraping," Techopedia.com, Dec. 23, 2014 [online]. Retrieved from: https://web.archive.org/web/20141223183223/https://www.techopedia.com/definition/16597/screen-scraping.

(Continued)

*Primary Examiner* — Sarah Su
(74) *Attorney, Agent, or Firm* — Paradice and Li LLP

(57) ABSTRACT

A data management system stores data related to a plurality of users. The data management system initially stores the data in an encrypted format. The data management system automatically periodically re-encrypts the data in accordance with a re-encryption policy. The re-encryption policy includes re-encryption periodicity data defining a periodicity for automatically re-encrypting the data.

23 Claims, 4 Drawing Sheets

(56) References Cited

U.S. PATENT DOCUMENTS

| | | | |
|---|---|---|---|
| 6,856,974 B1 | 2/2005 | Ganesan et al. | |
| 6,993,502 B1 | 1/2006 | Gryglewicz et al. | |
| 7,111,005 B1 | 9/2006 | Wessman | |
| 7,480,626 B1 | 1/2009 | Taricani, Jr. | |
| 7,490,248 B1* | 2/2009 | Valfridsson | G06F 21/6227 380/277 |
| 7,590,572 B2 | 9/2009 | Larson | |
| 7,711,741 B2 | 5/2010 | Lawler et al. | |
| 7,904,732 B2 | 3/2011 | Cui et al. | |
| 7,983,423 B1 | 7/2011 | Agarwal et al. | |
| 8,112,355 B1 | 2/2012 | Lam et al. | |
| 8,346,568 B1 | 1/2013 | Del Favero et al. | |
| 8,661,263 B2 | 2/2014 | Mattson | |
| 8,762,238 B2 | 6/2014 | Hahn-Carlson et al. | |
| 8,798,354 B1 | 8/2014 | Bunzel et al. | |
| 8,799,157 B1 | 8/2014 | Weisman et al. | |
| 8,812,877 B2* | 8/2014 | Mori | G06F 16/21 713/193 |
| 8,978,159 B1* | 3/2015 | van Dijk | G06F 21/6227 726/29 |
| 9,037,870 B1 | 5/2015 | Zheng et al. | |
| 9,286,332 B1 | 3/2016 | Roumeliotis et al. | |
| 9,397,983 B2 | 7/2016 | Moffat | |
| 9,443,268 B1 | 9/2016 | Kapczynski et al. | |
| 9,672,336 B1 | 6/2017 | Spence | |
| 9,774,445 B1 | 9/2017 | Gandhasri | |
| 9,934,494 B1 | 4/2018 | Nolte et al. | |
| 10,152,384 B1 | 12/2018 | Amit et al. | |
| 10,192,206 B2 | 1/2019 | Shanmugam et al. | |
| 10,303,895 B1 | 5/2019 | McCluskey et al. | |
| 10,380,370 B2 | 8/2019 | Syed-Ebrahim et al. | |
| 2002/0010666 A1 | 1/2002 | Wright | |
| 2002/0013850 A1 | 1/2002 | Mitchell et al. | |
| 2002/0087479 A1 | 7/2002 | Malcolm | |
| 2003/0055754 A1 | 3/2003 | Sullivan | |
| 2003/0101112 A1 | 5/2003 | Gallagher et al. | |
| 2003/0216990 A1 | 11/2003 | Star | |
| 2004/0139011 A1 | 7/2004 | Kozee et al. | |
| 2004/0172347 A1 | 9/2004 | Barthel | |
| 2004/0193542 A1 | 9/2004 | Brown et al. | |
| 2004/0210520 A1 | 10/2004 | Fitzgerald et al. | |
| 2004/0215560 A1 | 10/2004 | Amalraj et al. | |
| 2005/0177448 A1 | 8/2005 | Fu et al. | |
| 2005/0209965 A1 | 9/2005 | Ganesan | |
| 2005/0222952 A1 | 10/2005 | Garrett et al. | |
| 2005/0234820 A1 | 10/2005 | MacKouse | |
| 2005/0246234 A1 | 11/2005 | Munyon | |
| 2006/0050870 A1 | 3/2006 | Kimmel et al. | |
| 2006/0053112 A1 | 3/2006 | Chitkara et al. | |
| 2007/0074047 A1 | 3/2007 | Metzger et al. | |
| 2007/0079117 A1 | 4/2007 | Bhogal et al. | |
| 2007/0079119 A1* | 4/2007 | Mattsson | G06F 21/6227 713/164 |
| 2007/0100802 A1 | 5/2007 | Celik | |
| 2008/0133935 A1 | 6/2008 | Elovici et al. | |
| 2008/0255971 A1 | 10/2008 | McKinnon et al. | |
| 2008/0294555 A1 | 11/2008 | Bromma | |
| 2009/0089194 A1 | 4/2009 | Mathis et al. | |
| 2009/0132414 A1 | 5/2009 | Philliou et al. | |
| 2009/0196414 A1 | 8/2009 | Mittal et al. | |
| 2009/0282055 A1 | 11/2009 | Grant | |
| 2010/0100470 A1 | 4/2010 | Buchanan et al. | |
| 2010/0146269 A1 | 6/2010 | Baskaran | |
| 2011/0295731 A1 | 12/2011 | Waldron, III et al. | |
| 2012/0036370 A1 | 2/2012 | Lim et al. | |
| 2012/0110328 A1 | 5/2012 | Pate et al. | |
| 2012/0140923 A1 | 6/2012 | Lee et al. | |
| 2012/0150736 A1 | 6/2012 | Dickerson et al. | |
| 2012/0221420 A1 | 8/2012 | Ross | |
| 2012/0254000 A1 | 10/2012 | Ryzhikov et al. | |
| 2012/0260156 A1 | 10/2012 | Tsao et al. | |
| 2012/0303522 A1 | 11/2012 | May et al. | |
| 2013/0204756 A1 | 8/2013 | Orttung et al. | |
| 2013/0290708 A1 | 10/2013 | Diaz et al. | |
| 2014/0012746 A1 | 1/2014 | Hanson et al. | |
| 2014/0025564 A1 | 1/2014 | Evans | |
| 2014/0101713 A1 | 4/2014 | Entin et al. | |
| 2014/0129431 A1 | 5/2014 | Orttung et al. | |
| 2014/0222669 A1 | 8/2014 | Novak et al. | |
| 2014/0258104 A1 | 9/2014 | Harnisch | |
| 2014/0279459 A1 | 9/2014 | Weiss et al. | |
| 2014/0372169 A1 | 12/2014 | Kim et al. | |
| 2015/0019858 A1* | 1/2015 | Roth | H04L 63/0471 713/150 |
| 2015/0019879 A1* | 1/2015 | Haerterich | G06F 21/602 713/193 |
| 2015/0063449 A1* | 3/2015 | Pearson | H04N 19/176 375/240.05 |
| 2015/0186657 A1 | 7/2015 | Nakhjiri | |
| 2015/0220904 A1 | 8/2015 | Gibson et al. | |
| 2015/0365382 A1 | 12/2015 | Balakrishnan et al. | |
| 2016/0072824 A1 | 3/2016 | Johansson et al. | |
| 2016/0196424 A1 | 7/2016 | Chapman | |
| 2016/0232546 A1 | 8/2016 | Ranft et al. | |
| 2016/0300073 A1* | 10/2016 | Pomeroy | G06F 21/6227 |
| 2016/0300310 A1 | 10/2016 | Costanz | |
| 2017/0024743 A1 | 1/2017 | Fogel et al. | |
| 2017/0039652 A1 | 2/2017 | Sandre et al. | |
| 2017/0103227 A1* | 4/2017 | Kerschbaum | H04L 63/0478 |
| 2017/0126638 A1 | 5/2017 | Ye et al. | |
| 2017/0155628 A1 | 6/2017 | Rohloff et al. | |
| 2017/0257214 A1 | 9/2017 | Stufflebeam | |
| 2017/0316392 A1 | 11/2017 | Shanmugam et al. | |
| 2017/0316474 A1 | 11/2017 | Shanmugam et al. | |
| 2017/0316475 A1 | 11/2017 | Shanmugam et al. | |
| 2018/0032978 A1 | 2/2018 | Shanmugam et al. | |
| 2018/0032981 A1 | 2/2018 | Shanmugam et al. | |
| 2018/0033091 A1 | 2/2018 | Shanmugam et al. | |
| 2018/0046586 A1 | 2/2018 | Venkatesh | |
| 2018/0091306 A1* | 3/2018 | Antonopoulos | G06F 21/57 |
| 2019/0272381 A1* | 9/2019 | Yoon | G06F 16/27 |

OTHER PUBLICATIONS

Ravenscraft, "How I Used Mint Bills to Finally Simplify My Bill Payments," [online], Jul. 15, 2015. Retrieved from the internet <URL: https://lifehacker.com/how-i-used-mint-bills-to-finally-simplify-my-bill-payme-1717972364>.

"How Does Invoice Central Work?" [online]. Jan. 20, 2016, Retrieved from the internet <URL: www.invoicecentral.com/how-does-it-work/>.

* cited by examiner

130

|  | Name | SSN | Address | Income | Date of Birth |
|---|---|---|---|---|---|
| USER 1 | x | x | x | x | x |
| USER 2 | x | x | x | x | x |
| USER 3 | x | x | x | x | x |
| USER 4 | x | x | x | x | x |
| USER 5 | x | x | x | x | x |
| USER 6 | x | x | x | x | x |
| USER 7 | x | x | x | x | x |
| USER 8 | x | x | x | x | x |
| USER 9 | x | x | x | x | x |

SYSTEM AND METHOD FOR PERPETUAL REKEYING OF VARIOUS DATA COLUMNS WITH RESPECTIVE ENCRYPTION KEYS AND ON ALTERNATING BASES

RELATED CASE

This application is a continuation of McCluskey, et al., U.S. patent application Ser. No. 15/410,280, filed on Jan. 19, 2017, entitled "SYSTEM AND METHOD FOR PERPETUAL REKEYING OF VARIOUS DATA COLUMNS WITH RESPECTIVE ENCRYPTION KEYS AND ON ALTERNATING BASES," which is herein incorporated by reference in its entirety as if it were fully set forth herein.

BACKGROUND

Data security is rapidly becoming the most important, and potentially limiting factor in the fields of data store, data security, and data processing. While the emergence of portable data, "cloud computing," and other forms of distributed data processing and data sharing have the potential to provide truly revolutionary and paradigm shifting advances in human activity, the current inability to provide adequate levels of data security has prevented the realization of the full potential of these advances and capabilities.

In a cloud computing environment, an organization can control which resources a given party has access to by controlling access secrets, such as passwords and other authentication credentials that enable users to gain access to data. Nevertheless, in spite of the tremendous lengths to which organizations go to prevent unauthorized access to data, fraudsters still find ways to access the data. For example, fraudsters often find and exploit flaws in security and access protocols in order to gain unauthorized access to data. When this occurs, it is possible that fraudsters may find and exploit very sensitive data related to users of the data management system.

Due to these risks, traditional data management systems take further measures to prevent fraudsters who have gained access to sensitive data from making use of the sensitive data. For example, traditional data management systems typically encrypt their data so that if a fraudster gains access to the data, the data is not in a form that is useful to the fraudster without the proper encryption keys. However, resourceful fraudsters, given enough time, can still find ways to break the encryption and gain full access to the data.

Another common problem with traditional data management systems is that many traditional data management systems only encrypt data a single time. Once the data is encrypted, these traditional data management systems never re-encrypt the data. If a fraudster gains access to the encrypted data, the fraudster may have an indefinite period of time during which to break the encryption. Some traditional data management systems may re-encrypt data on occasion. However, this weak re-encryption is typically handled in an ad-hoc manner such that years may pass before an organization that maintains a data management system will decide to manually enact a re-encryption process. A fraudster that gains access to the encrypted data may have years to break the encryption before the data is re-encrypted. Eventually, the fraudster will succeed.

Furthermore, some traditional data management systems may encrypt an entire database with a single encryption key. If a fraudster breaks this single encryption scheme, the fraudster gains exploitable access to the entire data base. Other traditional data management systems may encrypt various records or rows of a database with different encryption keys. However, these traditional data management systems still suffer from the drawback that if a fraudster breaks the encryption on one portion of the database, the fraudster will be able to exploit that portion of the database to the detriment of the data management system and the users whose data has been compromised.

Consequently, there is a long standing technical problem in the data management arts in the form of a need to provide more effective data encryption procedures.

SUMMARY

Embodiments of the present disclosure address some of the shortcomings associated with current data storage security schemes by providing methods and systems that provide automatic and continuous re-encryption of data. Embodiments of the present disclosure provide a data management system that stores a large amount of data in one or more data stores. The data is related to a plurality of individuals and is arranged in data columns. Each data column includes a plurality of data entries of a respective data type or category. Each data entry in a data column is related to one of the individuals. When the data management system initially writes data to the one or more data stores, the data management system writes the data in an encrypted format. The data management system encrypts each data column with a respective different encryption. After the data management system has initially encrypted the data, the data management system enhances security beyond merely initially encrypting the data columns a single time. In particular, the data management system continuously and automatically re-encrypts the data columns in a periodic manner and with differing encryption for each data column. The data management system re-encrypts the data columns in accordance with a re-encryption policy that determines how often the data management system will re-encrypt the data. The re-encryption periodicity can be selected so that the data management system automatically re-encrypts the data within a sufficiently short period of time to ensure that it would be highly improbable for a fraudster who gains access to the data to break the encryption on any of the data columns before the data management system re-encrypts the data. In this way, even if a fraudster gains unauthorized access to the data, the fraudster will not be able to break the encryption of the data before the data management system re-encrypts the data. Furthermore, because the data columns each have different encryption, even if a fraudster was able to break the encryption on an individual data column, the data will be largely useless without breaking the encryption on other data columns to obtain related data.

Embodiments of the present disclosure overcome some of the drawbacks of traditional data management systems by automatically and continuously re-encrypting data and by re-encrypting individual data columns with different encryption. This can severely limit the opportunity for a fraudster to make use of data to which the fraudster has gained access. This also eliminates problems associated with manual ad hoc re-encryption procedures in which very long stretches of time may elapse before any re-encryption takes place or in which unfocused technicians may forget to implement any re-encryption processes. Additionally, providing different encryption to the various data columns can eliminate the ability of the fraudster to gain any amount of exploitable information by breaking encryption on a single data column because the data entries in a given data column cannot, by themselves, be linked to any individual or to corroborating data entries from other data columns. Embodiments of the present disclosure enhance the security and reliability of data management systems and reduce the wasteful use of human and computing resources in implementing outdated, unwieldy, and insufficient data security procedures. This transforms computing systems into more efficient computing systems.

In one embodiment, the data management system stores data related to a plurality of individuals. For example, data related to any particular individual can include a user identification number of the individual, a name of the individual, a Social Security number of the individual, a home address of the individual, a birth date of the individual, an income of the individual, an employer of the individual, and many other kinds of data. The data management system stores these types of data for large number of individuals. The data management system organizes the data in data columns. One data column can include a list of user identification numbers of the individuals. One data column can include a list of given names of the individuals. One data column can include a list of Social Security numbers of the individuals. One data called can include a list of home addresses of the individuals. One data column can include a list of dates of birth of the individuals. One data column can include a list of incomes of the individuals. One data column can include a list of employers of the individuals. Thus, each data column includes a plurality of data entries of a particular data type or category. Each data entry is related to one of the individuals.

In one embodiment, the data management system encrypts each of the data columns with a different encryption key. A fraudster that wants to exploit the data will have to break encryption on multiple data columns in order to be able to exploit any of the data. For example, if the fraudster gains access to the data and manages to break the encryption on the data column that includes Social Security numbers, the Social Security numbers are largely useless to the fraudster if the fraudster cannot also break the encryption on the data columns that includes the given names of the individuals, the dates of birth of the individuals, etc.

In one embodiment, the data management system automatically and periodically re-encrypts the data columns with differing encryptions. Thus, not only will a fraudster have to break the encryption on multiple data columns to gain any exploitable information, the fraudster will have a very limited period of time in which to break the encryption on any of the data columns because the data management system automatically and continuously re-encrypts the data columns.

In one embodiment, the data management system automatically and continuously re-encrypts the various data columns at different times. For example, if the periodicity data indicates that the data columns should be reencrypted weekly, the data management system can stagger the times at which the data columns are encrypted throughout the week. A data column including given names may be reencrypted beginning on Monday. A data column including Social Security numbers may be re-encrypted beginning on Wednesday.

In one embodiment, the data management system changes the various re-encryption times of the data columns for each re-encryption. For example, if the re-encryption period is weekly, then on one week the data column including given names may be reencrypt beginning on Monday, while the next week the data column including given names may be re-encrypted beginning on Thursday. The various re-encryption times for each of the data columns can be adjusted for each new re-encryption period.

In one embodiment, the data management system initially encrypts each data column with one or more encryption keys. The data management system then periodically re-encrypts each data column. When the data management system re-encrypts a given data column, the data management system reads the data from the data column in the data store by decrypting the data column using the one or more encryption keys associated with the most recent encryption process of the data column. The data management system then writes the data of the data column back to the data store in an encrypted format utilizing one or more new encryption keys that are different from the encryption keys associated with the previous encryption process of the data column. In this way, the data management system re-encrypts the data from a data column in the data store. After the data management system has re-encrypted the data column, the data management system again re-encrypts the data column within a time period specified by the selected periodicity. Each time the data management system re-encrypts the data column, the data management system reads the data in the data column from the data store and decrypts the data, then writes the data back to the data store and re-encrypts it. The data management system automatically and continuously re-encrypts each data column in this manner. In this way, the data management system continuously and automatically re-encrypts data in a data store.

In one embodiment, the data management system includes an encryption management module. The encryption management module manages encryption and re-encryption of the data stored in a data store. The encryption management module includes re-encryption policy data that defines a policy for re-encrypting the data. The re-encryption policy data can include periodicity data that defines the periodicity or frequency with which the data management system will re-encrypt the data.

In one embodiment, the periodicity data can define that the data should be re-encrypted once every specified number of months. In one embodiment, the periodicity data can define that the data should be re-encrypted once every specified number of weeks. In one embodiment, the periodicity data can define that the data should be re-encrypted once every specified number of days. In one embodiment, the periodicity data can define that the data should be re-encrypted once every specified number of hours. Thus, the periodicity data can specify a re-encryption period of months, weeks, days, hours, or even minutes. The encryption management module will cause continuous re-encryption of the data columns based on the periodicity data.

In one embodiment, the data management system can include an encryption policy control module. The encryption policy control module enables an expert, a technician, an authorized application, or an authorized computing system to enter new re-encryption policy data to the encryption management module. In this way, the re-encryption policy data can be initially provided, can be adjusted, or revised as needed by authorized personnel, applications, or systems.

In one embodiment, the data management system includes an encryption engine that performs the encryption and re-encryption of the data under the control of the reencryption management module. The encryption engine can include encryption algorithm data that defines one or more algorithms with which the data will be encrypted and re-encrypted. The encryption engine periodically re-encrypts the data columns in accordance with the re-encryption policy data under the direction of the encryption management module. The encryption engine utilizes or generates encryption key data including, for each data column, one or more encryption keys to encrypt the data in accordance with the one or more encryption algorithms of the encryption algorithm data. In one embodiment, the encryption engine utilizes or generates, for each data column, decryption key data including one or more decryption keys for decrypting the data as part of a re-encryption process.

In one embodiment, the data store includes one or more physical or virtual data storage devices. The data storage devices can be located in diverse locations. For example, the data management system can include multiple data centers each including a large number of data storage devices. The multiple data centers can be located in various geographic locations around the world. These multiple data centers and data storage devices can collectively store the data. A single data column of the data may include data stored in a single location or in multiple locations.

In one embodiment, the data management system can include a user services provider system that provides data storage and data management services for a large number of users. The individuals associated with the data can correspond to users of the user services provider system. Thus, the data stored in the data store can include data related to the users of the user services provider system. In some cases, the users may not directly access the data. Instead the users access the user services provider system in order to receive services from the user services provider system. The user services provider system may access the data in order to provide various services to the user related to the data. In some cases, the user may directly access the data through the user services provider system.

In one embodiment, the user services provider system can include a financial management system. The financial management system can include one or more of a tax return preparation system, a payroll management system, a budgeting system, or a system that provides any other kind of financial management service to users. The data can include financial data related to the large number of users. In this case, the data can include the names of the users, Social Security numbers of the users, identification numbers of the users, birthdates of the users, addresses of the users, financial transaction data related to the users, banking data, loan data, credit card data, and many other kinds of financial data related to the users. Each data column can include a single data type or category of the financial related data.

When users access the financial management system, the financial management system accesses the data related to the users in order to provide financial management services to the user, such as a tax return preparation interview in order to prepare the tax return. In this case, the user may not directly access the data. Instead the financial management system accesses the data and helps the user to fill out electronic versions of tax forms. Thus, the user may not access the data in order to directly retrieve or download the user data, but instead the financial management system accesses the data, in addition to or including data provided by the user, in order to provide tax return preparation services to the user.

The financial data related to the users can include very sensitive data. If this very sensitive data is compromised by a fraudster in a way that the sensitive data can be made use of by the fraudster, e.g. by breaking the encryption on the sensitive data, the users of the financial management system can suffer great harm. Accordingly, the data management system, of which the financial management system is a part, continuously and automatically re-encrypts the data col-umns of the financial related data. Thus, even if a fraudster is able to access the encrypted financial data, the financial data would be re-encrypted so quickly as to prevent the fraudster from being able to break the encryption before the financial data is re-encrypted. Furthermore, even if the fraudster is able to break the encryption on any given data column, the fraudster will not be able to exploit the data unless the fraudster is also able to break the encryption on other data columns that include data entries that can be linked to the data entries in the first data column. In this way, the data management system enhances the security of the users' financial data.

In one example, the data management system manages the data in conjunction with a third-party cloud platform service provider that provides cloud platform services. The cloud platform service provider includes a cloud platform service provider such as Amazon Web Services (AWS), Microsoft Azure, Rackspace, Joyent, Google Cloud, or other cloud platform service providers. The data store can include data centers external to the data management system. The data management system can work with the cloud platform service provider to manage the data in various external and internal data stores.

The disclosed embodiments provide one or more technical solutions to the technical problem of security deficiencies in data management systems by automatically and continuously re-encrypting data in a data store. These and other embodiments of the data management system are discussed in further detail below.

Providing automatic and continuous re-encryption of data in a data store is a technical solution to a long standing technical problem and is not an abstract idea for at least a few reasons. First, providing automatic and continuous re-encryption of data in a data store is not an abstract idea because it is not merely an idea itself (e.g., can be performed mentally or using pen and paper). Second, providing automatic and continuous re-encryption of data in a data store is not an abstract idea because it is not a fundamental economic practice (e.g., is not merely creating a contractual relationship, hedging, mitigating a settlement risk, etc.). Third, providing automatic and continuous re-encryption of data in a data store is not an abstract idea because it is not a method of organizing human activity (e.g., managing a game of bingo). Fourth, although mathematics may be used in encrypting and re-encrypting data, the disclosed and claimed methods and systems of providing automatic and continuous re-encryption of data in a data store are not an abstract idea because the methods and systems are not simply a mathematical relationship/formula.

In addition, providing automatic and continuous re-encryption of data in a data store is not an abstract idea because improving the security of users' data allows for significant improvement to the technical fields of user experience, customer service, customer retention, and electronic data management, according to one embodiment. The present disclosure adds significantly to the field of electronic data management because the disclosed data management system: decreases the likelihood that a user will be forced to undergo the psychological insecurity of learning that their personal data may have been comprised; increases the likelihood that users will not suffer harmful real world consequences from their personal data actually being obtained and exploited by fraudsters; and increases the likelihood of improving/maintaining a user's trust in the data management system, according to one embodiment.

As a result, embodiments of the present disclosure allow for reduced usage of processor cycles, memory, and power consumption, by reducing the time and resources spent by data management systems to increase access controls and other aspects of data security to compensate for deficient data encryption. Consequently, computing and communication systems implementing or providing the embodiments of the present disclosure are transformed into more operationally efficient devices and systems.

In addition to improving overall computing performance, providing automatic and continuous re-encryption of data in a data store significantly improves the field of data management systems by reducing the inefficient and ad-hoc nature of data encryption management, according to one embodiment. Therefore, both human and non-human resources are utilized more efficiently. Furthermore, by providing automatic and continuous re-encryption of data in a data store, loyalty in the data management system is increased, which results in repeat customers, efficient re-encryption and security practices, and reduced abandonment of use of the data management system, according to one embodiment.

BRIEF DESCRIPTION OF THE DRAWINGS

FIG. 2 is a representation of data organized into data columns in relation to software architecture for automatically and continuously re-encrypting data in a data store, in accordance with one embodiment.

Figure 1:
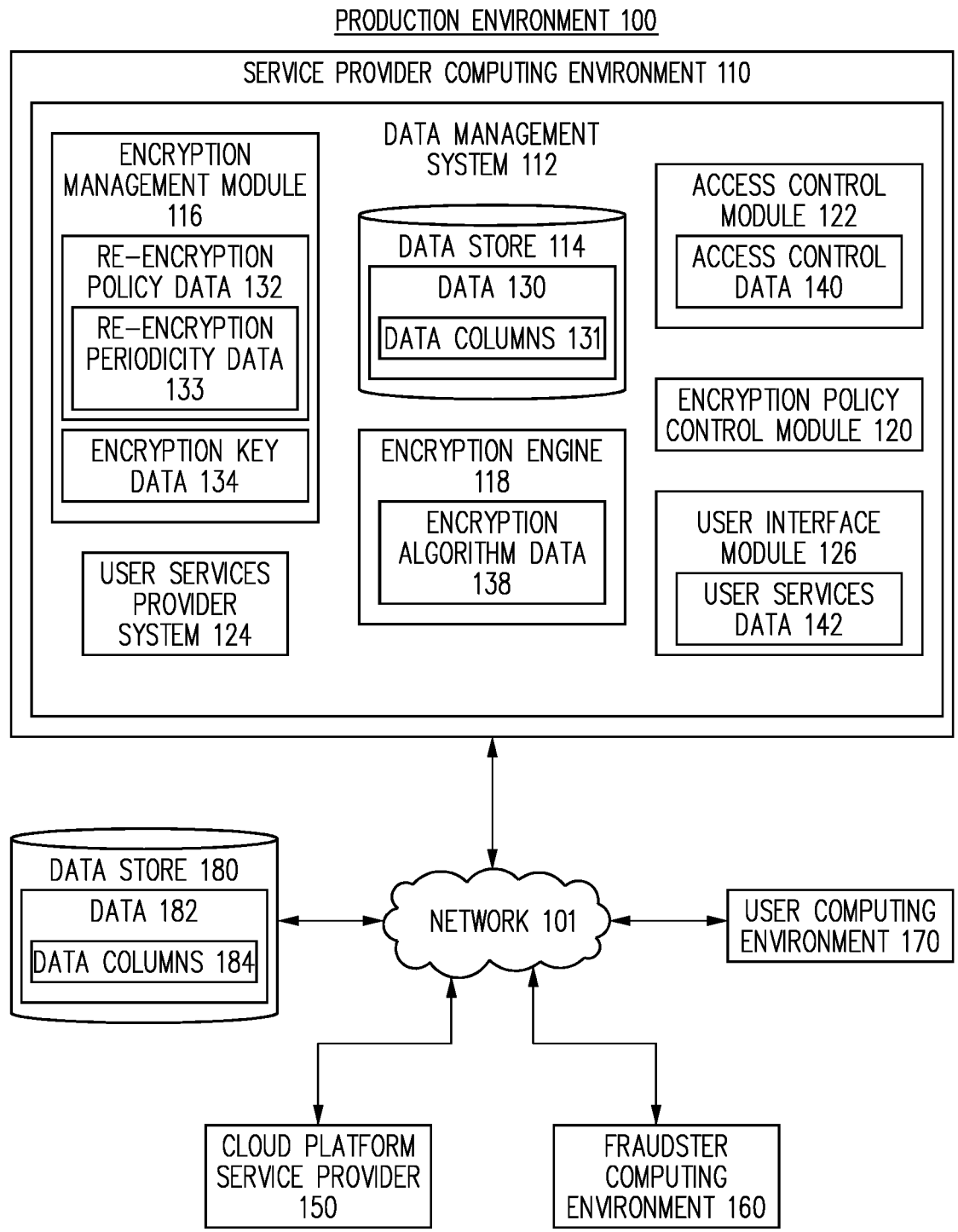
FIG. 1 is a functional block diagram of software architecture for automatically and continuously re-encrypting data in a data store, in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted"

environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a Virtual Private Cloud (VPC); or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, or entities using, or otherwise interacting with any of the methods or systems discussed herein. For instance, in various embodiments, a user can be, but is not limited to, a person, a commercial entity, an application, a service, or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term "data store" or "data storage device" includes, but is not limited to, any physical or virtual data source or storage device. For instance, in various embodiments, a data store or storage container can be, but is not limited to, one or more of a hard disk drive, a solid-state drive, an EEPROM, an optical disk, a server, a memory array, a database, a virtual database, a virtual memory, a virtual data directory, or other physical or virtual data sources.

As used herein, the term file includes, but is not limited to, a data entity that is a sequence of bytes that can be accessed individually or collectively.

As used herein the term data object includes, but is not limited to, a data entity that is stored and retrieved as a whole, or in large chunks, rather than as a sequence of bytes.

Hardware Architecture

FIG. 1 illustrates a block diagram of a production environment 100 for automatically and continuously re-encrypting data in a data store, according to one embodiment. Embodiments of the present disclosure provide methods and systems for automatically and continuously re-encrypting data in a data store, according to one embodiment. Embodiments of the present disclosure store large amounts of data in a data store. The data is related to a large number of individuals and is organized in data columns. Each data column includes a plurality of data entries of a particular data type or category. Each data entry is related to one of the individuals. When data is first written to or stored in the data store, embodiments of the present disclosure store the data in an encrypted format in accordance with one or more encryption processes. Each data column is encrypted with a different respective encryption. Thereafter, embodiments of the present disclosure continuously and automatically re-encrypt the data columns in the data store. In particular, embodiments re-encrypt the data columns in accordance with a re-encryption policy that defines a periodicity with which the data will be re-encrypted. The periodicity can include a period months, weeks, days, or hours. Embodiments of the present disclosure will re-encrypt each data column at least once in each defined period. The re-encryption period can be set to be sufficiently small so that breaking the encryption on any given data column before the data column is re-encrypted is so improbable as to be practically impossible. Thus, if a fraudster gains access to the encrypted data columns, the fraudster will not be able to decrypt or break the encryption on any of the data columns before the data columns are re-encrypted. Because the data is perpetually re-encrypted, the fraudster never has sufficient time to decrypt the data before the data is re-encrypted with a different encryption. In the unlikely event that a fraudster is able to break the encryption on one of the data columns, the data will be useless to the fraudster unless the fraudster can also break the encryption on other of the data columns in order to obtain additional data entries that can be linked to the data entries in the first data column. By providing automatic and continuous re-encryption of data in a data store, security of the data is increased.

In addition, the disclosed method and system for automatically and continuously re-encrypting data in a data store provides for significant improvements to the technical fields of electronic data security, data processing, data management, and user experience.

In addition, as discussed above, the disclosed method and system for automatically and continuously re-encrypting data in a data store provides for the processing and storage of smaller amounts of data related to security systems, i.e., fewer security systems are needed and less effective security measures can be discarded; thereby eliminating unnecessary data analysis and storage. Consequently, using the disclosed method and system for automatically and continuously re-encrypting data in a data store results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for automatically and continuously re-encrypting data in a data store.

The production environment 100 includes a service provider computing environment 110, a cloud platform service provider 150, a fraudster computing environment 160, a user computing environment 170, and a data store 180. The various components of the production environment 100 are coupled together by one or more physical or virtual networks 101, according to one embodiment.

The computing environment 110 represents one or more computing systems such as a server or distribution center that is configured to receive, execute, and host one or more data management systems, according to one embodiment. The computing environment 110 represents a traditional data center computing environment, a virtual asset computing environment (e.g., a cloud computing environment), or a hybrid between a traditional data center computing environment and a virtual asset computing environment, according to one embodiment.

In one embodiment, the data management system 112 manages data stored in a data store. The data is related to a large number of individuals and is organized in data columns. Each data column includes data entries of a particular data type or category. Each data entry is related to one of the individuals. When the data management system 112 initially writes data to the one or more databases, the data management system 112 writes the data in an encrypted format. The data management system encrypts each data column with a different encryption. However, after the data management system 112 has initially written the data in an encrypted format, the data management system 112 enhances security beyond merely initially encrypting the data. In particular, the data management system 112 continuously and automatically re-encrypts the data. The data management system 112 continuously and automatically re-encrypts each data column with a respective different encryption. The respective different encryption is different from the prior encryption of the data column and from the new encryptions of the other data columns. The data management system 112 re-encrypts the data columns in accordance with a re-encryption periodicity that determines how often the data management system 112 will re-encrypt the data. The re-encryption periodicity can be selected so that the data management system 112 automatically re-encrypts the data columns within a sufficiently short period of time that it would be practically impossible for a fraudster who gains access to the data to break the encryption on any of the data columns before the data management system 112 re-encrypts the data columns with a new encryption. In this way, even if a fraudster gains unauthorized access to the data, the fraudster will not be able to break encryption on any of the data columns before the data management system 112 re-encrypts the data columns. Additionally, in the unlikely event that a fraudster is able to break the encryption on one of the data columns, the data entries in the data column will be useless to the fraudster unless the fraudster is able to break the encryption on additional data columns as well. Embodiments of the present disclosure overcome some of the drawbacks of previous data management systems by automatically and continuously re-encrypting data and in particular by continuously and automatically re-encrypting each data column with its own encryption. This can greatly limit the opportunity for a fraudster to make use of data to which the fraudster has gained access. Embodiments of the present disclosure enhance the security and reliability of data management systems and reduce the wasteful use of human and computing resources in implementing outdated, unwieldy, and insufficient data security procedures. This transforms computing systems into more efficient computing systems.

The present disclosure makes reference to encrypting data columns. Encrypting a data column corresponds to encrypting the data assigned to the data column, associated with the data column, or contained within the data column. Thus, to encrypt a data column is to encrypt the data of the data column. Furthermore, organizing data in a data column does not necessarily refer to a physical distribution of the data in any physical memory or memories.

In one embodiment, the data management system 112 includes a data store 114, an encryption management module 116, an encryption engine 118, an encryption policy control module 120, an access control module 122, a user services provider system 124, and a user interface module 126. The data management system 112 utilizes these modules, engines, and systems to securely manage and utilize data stored in the data store 114, in one embodiment.

In one embodiment, the data store 114 stores data 130. The data 130 can include data related to a large number of users of the data management system 112. The data 130 is organized in data columns 131. Each data column 131 includes data entries of a particular data type or category. Each data entry is related to one of the users. The data 130 can include data stored on behalf of organizations, individuals, businesses, government agencies, or other entities. The individuals, businesses, government agencies, or other entities can request that the data be stored by the data management system 112 in the data store 114. In some cases, the data 130 may be stored not at the request of or on behalf of individuals, organizations, businesses, government agencies, or other entities, but rather as a general data collection of an electronic services provider that provides one or more data services for customers or for other purposes. The data 130 can be received from one or more data sources including the individuals, organizations, businesses, or government agencies with which the data 130 is associated. The data 130 can also be received from third party data sources. The data 130 can be generated or collected by the data management system 112.

In one embodiment, the data store 114 includes one or more data storage devices or systems. The data storage devices or systems can be located in diverse locations. For example, the data management system 112 can include multiple data centers each having a large number of data storage devices or systems. The multiple data centers can be located in various geographic locations. These multiple data centers and data storage devices can collectively store the data 130. The data store 114 can include one or more servers, hard disk drives, solid state drives, EEPROMs, optical disks, memory arrays, databases, virtual databases, virtual memories, virtual data directories, or other physical or virtual data sources.

In one embodiment, the data store 114 can store multiple copies of the various files or data objects of the data 130 in multiple locations, databases, or devices. In this way, if a particular data item is to be accessed from a default location in the data store 114, but the default location is inaccessible for some reason, a copy of that data can be accessed from an alternate location within the data store 114.

The data 130 can include very sensitive information. The sensitive information can include personal information associated with individuals such as names, government identification numbers, birth dates, data related to children and spouses, medical data, financial data, account numbers, passwords, or other types of sensitive data related to individuals. The data 130 can include sensitive data related to business organizations. The sensitive data related to business organizations can include organizational operating secrets, strategies, financial data, account numbers, passwords, accounting data, payroll data, budgeting data, financial transaction data, or other types of sensitive data.

As set forth above, the data 130 can be organized in data columns 131. Each data column 131 can include a plurality of data entries of a particular data type or category. For example, the data 130 can include, for each user of the data management system, a user identification number, a given name of the user a government identification number of the user, a birth date of the user, a marital status of the user, a mailing address of the user, an employer identification number of the user, a number of children of the user, and other types of data. If a fraudster is able to gain access to all of the data related to an individual user, the fraudster will be able to exploit the data in a way that can be very harmful to the user and to the data management system 112. For this reason, the data management system 112 organizes the data 130 in data columns 131. A first data column 131 can include user identification numbers of the users. A second data column 131 can include given names of the users. A third data column 131 can include government identification numbers of the users. A fourth data column can include birthdates of the users. A fifth data column can include marital status data of the users. A sixth data column 131 can include mailing addresses of the users. A seventh data column 131 can include employer identification numbers of the users. Additional data columns 131 can include data entries of other types or categories.

In one embodiment, because the data 130 can include sensitive data, the data management system 112 stores the data 130 in an encrypted format in the data store 114. Each data column 131 is encrypted with its own encryption. The data management system 112 utilizes the encryption management module 116 and the encryption engine 118 to write new data to the data columns 131 of the data 130 in the data store 114 in an encrypted format in accordance with the various encryptions of the data columns 131. Writing the data in an encrypted format is a security measure to prevent easy access and exploitation of the data 130 by fraudsters and malfeasants, or even by others who accidentally gain access to the data 130 through error or fluke. Organizing the data 130 in data columns 131 as set forth above and encrypting each data column 131 with a unique encryption is an additional security measure to further inhibit fraudsters or malfeasants from being able to exploit the data 130 in a way that is harmful to individuals and to the data management system 112.

In one embodiment, the encryption management module 116 manages encryption of the data 130. The encryption management module 116 manages encryption of the data 130 by controlling the encryption engine 118. The encryption engine 118 performs the actual encryption of the data 130. The encryption management module 116 manages or controls the encryption engine 118. Thus, the encryption management module 116 causes the encryption engine 118 to encrypt the data columns 131 of the data 130. This can include causing the encryption engine 118 to write new data to the data columns 131 of the data 130 in accordance with the respective encryptions of the data columns 131.

In one embodiment, the encryption engine 118 includes encryption algorithm data 138. The encryption algorithm data 138 includes one or more encryption algorithms by which the encryption engine 118 encrypts the data columns 131 of the data 130. The encryption algorithm data 138 can specify one or more types of encryption or encryption processes to be used by the encryption engine 118 in encrypting the data columns 131 of the data 130. For example, the encryption algorithm data 138 can specify a level of encryption such as 16-bit encryption, 32-bit encryption, 128-bit encryption, etc. The encryption algorithm data 138 can include symmetric encryption algorithms, asymmetric encryption algorithms, or other types of encryption algorithms.

In one embodiment, the encryption algorithm data 138 can specify multiple encryption algorithms for encrypting the various data columns 131 of the data 130 with different types or levels of encryption. For example, less sensitive data columns 131 may be encrypted using a less resource intensive encryption algorithm. More sensitive data columns 131 may be encrypted using a more resource intensive and more secure encryption algorithm.

In one embodiment, the encryption management module 116 manages the encryption engine 118 based on re-encryption policy data 132. The re-encryption policy data 132 includes data specifying how and when the encryption engine 118 should re-encrypt the data 130. The re-encryption policy data 132 can identify which encryption algorithms should be used for various data columns 131 of the data 130. The re-encryption policy data 132 can specify a level of encryption for various data columns 131 of the data 130.

As described previously, it is possible that a fraudster may gain access to a portion of the data 130. The encryption of the data 130, and in particular, the encryption of the data columns 131, helps to inhibit the fraudster from being able to obtain the portion of the data in a useful format. In particular, the encryption renders the data columns 131 unreadable unless the data columns 131 can be decrypted. While simply encrypting the data 130 is helpful to inhibit some fraudsters, resourceful or determined fraudsters may eventually be able to decrypt the data 130 and obtain a plainly readable form of the data 130. Typically, the lower the level of encryption, the more quickly a fraudster may be able to break the encryption. The higher the level of encryption, the longer it will take for a fraudster to break the encryption. One reason for this is that the fraudster may need to generate a vast number of encryption keys and attempt to decrypt the data 130 with each of the generated encryption keys until an encryption key has been found that can decrypt the data 130. Thus, even though the data 130 may be encrypted with a high-level or highly secure encryption algorithm, given enough time the fraudster will be able to break the encryption and gain access to the data 130 in a manner that allows the fraudster to exploit the data to the benefit of the fraudster and to the detriment of the parties related to the data 130.

Accordingly, in one embodiment, the data management system 112 overcomes some of the drawbacks associated with typical encryption practices by including in the re-encryption policy data 132 re-encryption periodicity data 133. The re-encryption periodicity data 133 indicates that the encryption management module 116 should continuously and automatically re-encrypt the data columns 131 of the data 130 at least once in each period defined by the re-encryption periodicity data 133. The continuous and automatic re-encryption of the data columns 131 of the data 130 serves to inhibit fraudsters from breaking encryption on the data 130 and gaining exploitable access to the data 130. For example, if a fraudster is able to access the data 130, the fraudster will begin the process of trying to decrypt one or more of the data columns 131 of the data 130. However, the re-encryption periodicity data 133 causes the encryption management module 116 to instruct the encryption engine 118 to re-encrypt the data columns 131 of the data 130 with a new encryption in a continuous or repeating manner. Thus, before the fraudster can get very far in the decryption process of any of the data columns 131, the encryption engine 118 will re-encrypt the data columns 131 of the data 130 with a new encryption, thereby frustrating the attempts by the fraudster to decrypt the data 130. Furthermore, in the unlikely event that a fraudster is able to break the encryption on one of the data columns 131 before re-encryption occurs, the data entries in the data column 131 will be largely useless to the fraudster unless the fraudster is able to break the encryption on additional data columns as well. In this way, the encryption management module 116, in accordance with the re-encryption periodicity data 133 overcomes some of the drawbacks associated with traditional data management systems by continuously and automatically re-encrypting the data columns 131 of the data 130.

In one embodiment, the re-encryption periodicity data 133 can define that the data should be re-encrypted once every specified number of months. In one embodiment, the periodicity data 133 can define that the data columns 131 should be re-encrypted once every specified number of weeks. In one embodiment, the periodicity data 133 can define that the data columns 131 should be re-encrypted once every specified number of days. In one embodiment, the periodicity data can define that the data columns 131 should be re-encrypted once every specified number of hours. In one embodiment, the periodicity data 133 can define that the data columns 131 should be re-encrypted once every specified number of minutes. In one embodiment, the periodicity data 133 can define that the data columns 131 should be re-encrypted once in any period desired. Thus, the periodicity data 133 can specify a re-encryption period of months, weeks, days, or even hours. The encryption management module 116 will enforce continuous re-encryption of the data 130 based on the periodicity data 133.

In one embodiment, the periodicity data 133 can be selected based on the strength of the encryption with which the data 130 is encrypted, in order to efficiently manage the resources of the data management system 112. The periodicity data 133 can specify a re-encryption period that, in combination with the level of encryption of the data 130, defines a probability that is below a selected threshold probability that a fraudster would be able to break the encryption on the data 130 within the selected period defined by the periodicity data 133. For example, the data management system 112 may specify that the combination of the re-encryption period and the level of encryption should result in a probability of less than one 1 millionth of one percent that a fraudster can break the encryption within the defined period. For higher levels of encryption strength, a larger period of time between re-encryption of the data 130 may be suitable. For low levels of encryption strength, a shorter period of time between re-encryption of the data 130 may be suitable. In this way, a balance can be struck between encryption strength and re-encryption periodicity that efficiently utilizes the resources of the data management system 112.

In one embodiment, the re-encryption periodicity data 133 can specify a re-encryption periodicity that renders the probability that a fraudster can break the encryption on any of the data columns 131 so small as to be practically impossible.

In one embodiment, the encryption management module 116 includes encryption key data 134. The encryption key data 134 includes data relating to one or more encryption keys generated by the encryption engine 118 for each data column 131 when encrypting the data columns 131. The encryption key data 134 enables the data columns 131 to be encrypted and decrypted. The encryption keys may be any one of a number of types of encryption keys, such as, but not limited to, public key infrastructure ("PKI") encryption keys. In one example implementation, the encryption keys include symmetric encryption keys, so that encryption and decryption of the data columns 131 are both performed using the encryption keys. In another example implementation, each encryption key is one of an asymmetric encryption key pair, e.g., a private key or a public key, that may be used for encrypting a data column 131 or a portion of a data column 131 but that may not be used to decrypt the data column 131. The encryption keys, according to other example embodiments, may represent other encryption algorithms as well. As used herein, encryption keys can also include decryption keys that are associated with particular encryption keys and that may be used to decrypt data that has been encrypted with particular encryption keys.

In one embodiment, when the data management system 112 re-encrypts a data column 131, the encryption management module 116 causes the data column 131 to be decrypted and read so as to place the data column 131 in an unencrypted form. The encryption management module 116 then causes the encryption engine 118 to write the data from the data column 131 back to the data store 114 in a newly encrypted format. Thus, in a re-encryption process for a data column 131, the data management system 112 decrypts and reads the data column 131 from the data store 114 by decrypting the data column 131 using one or more encryption or decryption keys associated with the most recent prior encryption process for the data column 131 and contained in the encryption key data 134. The data management system 112 then writes the data from the data column 131 back to the data store 114 in an encrypted format utilizing one or more new or current encryption keys that are different from the encryption keys associated with the previous encryption process for the data column 131. The new encryption keys are stored in the encryption key data 134. In this way, the data management system re-encrypts a data column 131 in the data store 114. After the data management system 112 has re-encrypted the data column 131, the data management system 112 again re-encrypts the data column 131 within a time period specified by the selected periodicity. Each time the data management system 112 re-encrypts the data column 131, the data management system 112 reads the data column 131 from the data store 114, decrypts the data column 131, then writes the data column 131 back to the data store 114 and re-encrypts it.

In one embodiment, the encryption management module 116, in conjunction with the re-encryption policy data 132, can continuously re-encrypt the data 130 such that there is little or no gap between encryption cycles for the encryption engine 118. The amount of data in the data 130 may be extremely large. The encryption engine 118 cannot instantaneously re-encrypt all of the data in the data 130. Accordingly, the encryption engine 118 may begin a new re-encryption process nearly instantaneously upon finishing the previously re-encryption process. Thus, if the encryption engine 118 requires a week to re-encrypt all of the data 130, the encryption periodicity data 133 may simply specify that the encryption engine 118 should begin re-encrypting the data 130 immediately upon finishing the previously re-encryption cycle. Alternatively, in one embodiment, the data management system 112 can allocate processing resources to the encryption engine 118 sufficient to encrypt the entirety of the data 130 within the period specified by the re-encryption periodicity data 133. Thus, the encryption engine 118 can be configured with processing resources commensurate with the re-encryption period defined by the re-encryption periodicity data 133.

In one embodiment, the encryption engine 118 can complete a re-encryption cycle well ahead of the beginning of the next specified re-encryption cycle as set forth in the re-encryption periodicity data 133. In this case, the encryption engine 118 may be idle for some amount of time between the ending of one re-encryption cycle and the beginning of the next re-encryption cycle.

In one embodiment, the re-encryption policy data 132 can specify that various data columns 131 should be re-encrypted on respective staggered re-encryption cycles. For example, the re-encryption periodicity data 133 may specify a re-encryption period of two weeks. However, the re-encryption policy data 132 may specify that the encryption engine 118 should re-encrypt some data columns 131 on a first day of the encryption cycle, that the encryption engine 118 should re-encrypt a second set of data columns 131 on a second day of the encryption cycle, that the encryption engine 118 should re-encrypt a third set of data columns 131 on a third day of the encryption cycle, etc. In this way, the re-encryption policy data 132 can stagger the re-encryption of various portions of the data 130 at various times.

In one embodiment, the encryption policy data 132 can specify other re-encryption triggers. For example, standard and authorized accesses of the data 130 may fit into a known and recognizable pattern. Unauthorized attempts to access certain data columns 131 may fall outside of this known pattern. In one embodiment, the data management system 112 monitors all of the access attempts to the data columns 131. In the event that fraudsters attempt to gain access to certain of the data columns 131, this monitoring may notice an unusual pattern in accesses or access attempts to the data columns 131. Accordingly, the re-encryption policy data 132 may indicate that the encryption management module 116 can initiate re-encryption of one or more of the data columns 131 or even the entirety of the data 130 in the event of abnormal patterns of attempts to access the data 130. The re-encryption policy data 132 can specify the exact circumstances in which abnormal access attempts result in the initiation a re-encryption process. The re-encryption policy data 132 can also specify whether all of the data 130 should be re-encrypted based on these abnormal patterns, whether only certain data columns 131 should be re-encrypted based on these abnormal patterns, or whether only those data columns 131 that were the subject of abnormal access patterns should be re-encrypted. In this way, the re-encryption policy data 132 manages the re-encryption of the data 130 based on more than just periodicity or frequency of re-encryption cycles. This can further enhance the security of the data 130.

In one embodiment, the data management system 112 utilizes the encryption policy control module 120 to provide, define, adjust, or revise the re-encryption policy data 132. The encryption policy control module 120 enables an expert, a technician, an authorized application, or an authorized computing system to enter new re-encryption policy data 132 to the encryption management module 116. In this way, the re-encryption policy data 132 can be initially provided or can be adjusted or revised as needed by authorized personnel, applications, or systems.

In one embodiment, the data management system 112 utilizes the access control module 122 to control access to the data 130. The access control module 122 can include access control data 140 that determines what individuals, machines, virtual machines, applications, programs, or processes can access the data 130. The access control data 140 can include sets of access secrets or lists of credentials that must be provided by an individual, machine, application, process, or program that seeks access to the data 130. The access secrets can include passwords, keys, identification codes, serial numbers, or other data that can be used to verify the credentials of a requesting individual, machine, application, process, or program to gain access to the data 130.

A fraudster seeking to gain access to data 130 may, through various methods, deceive the access control module 122 into granting access to data 130. Alternatively, the fraudster may, through various methods, circumvent the access control module 122 entirely and gain direct access to the data 130 in the data store 114. Nevertheless, the fraudster may lack the encryption keys needed to decrypt the data 130 and may need to attempt to break the encryption of the data 130 in order to obtain the data 130 in a useful form. Thus, in the event of the failure of the access control module 122, the continuous re-encryption of data 130 may prevent the fraudster from exploiting the data 130 in a way that can be harmful to the data management system 112, to users, to organizations, or other interested parties.

In one embodiment, the data management system 112 can include a user services provider system 124 that provides data storage and data management services for a large number of users. The data 130 stored in the data store 114 can include data related to the users of the user services provider system 124. In one embodiment, users may directly access that portion of the data 130 that is theirs. For example, in an embodiment in which the data management system 112 provides a cloud-based data backup or data store service for users, users may gain direct access to the data 130 that is related to them.

In one embodiment, the users may not directly access the data 130. Instead the users access the user services provider system 124 in order to receive services from the user services provider system 124. The user services provider system 124 may access the data in order to provide various services to the user related to the data.

In one embodiment, the user services provider system 124 can include a financial management system. The financial management system can include one or more of a tax return preparation system, a payroll management system, a budgeting system, or a system that provides any other kind of financial management service to users. The data can include financial data related to the large number of users. In this case, the data can include, for each user, data such as, but not limited to, a name of the user, a name of the user's employer, an employer identification number (ED), a job title, annual income, salary and wages, bonuses, a Social Security number, a government identification, a driver's license number, a date of birth, an address, a zip code, home ownership status, marital status, W-2 income, an employer's address, spousal information, children's information, asset information, medical history, occupational information, information regarding dependents, salary and wages, interest income, dividend income, business income, farm income, capital gain income, pension income, IRA distributions, education expenses, health savings account deductions, moving expenses, IRA deductions, student loan interest, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial system or in the preparation of financial documents such as a user's tax return, according to various embodiments. Each data column 131 of the data 130 can include a set of data entries from a respective data type or category listed above. Each data entry in a data column 131 can be related to one of the users of the financial management system.

In one embodiment, the data management system 112 is a financial management system.

When users access the financial management system, the financial management system accesses the data related to the users in order to provide financial management services to the user, such as a tax return preparation interview in order to electronically prepare a tax return. In this case, the user may not directly access the data. Instead the financial management system accesses the data and helps the user to fill out electronic versions of tax forms with the financial data. Thus, the user may not access the data in order to directly retrieve or download the user data, but instead the financial management system accesses the data in order to provide tax return preparation services to the user.

The financial data related to the users can include very sensitive data. If this very sensitive data is compromised by a fraudster in a way that the sensitive data can be made use of by the fraudster, e.g. by breaking encryption on the sensitive data, the users of the financial management system can suffer great harm. Thus, the data management system 112, of which the financial management system is a part, continuously and automatically re-encrypts the financial data as set forth above. Additionally, the financial data is organized in data columns 131 that are separately encrypted and re-encrypted. Because of this, even if a fraudster was able to access the encrypted financial data, the financial data would be re-encrypted so quickly as to prevent the fraudster from being able to break the encryption before the financial data was re-encrypted. Additionally, even if the fraudster was able to break the encryption on a single data column 131, the data contained in the data column 131 would be largely useless to the fraudster and harmless to the users unless the fraudster can also decrypt other data columns 131, which is even more unlikely. In this way, the data management system enhances the security of the users' financial data.

In one embodiment, the data management system 112 utilizes the user interface module 126 to interface with the user computing environment 170. Thus, when a user of the user services provider system 124 seeks to utilize the user services provider system 124, the user computing environment 170 accesses the user interface module 126 to communicate with the user services provider system 124. The user services provider system 124 may access the portion of the data 130 in conjunction with providing user services data 142 to the user computing environment 170. The user services data 142 can include providing financial management services to the user such as a tax return preparation interview process by which the user services provider system 124 assists the user to prepare the user's tax return by utilizing, in part, the data 130.

In one embodiment, the user computing environment 170 accesses the user interface module 126 of the data management system 112 via the network 101. The network 101 can include, in one embodiment, the Internet.

In one embodiment, a fraudster may seek to access the data management system 112 from a fraudster computing environment 160 via the network 101. In particular, the fraudster may seek to utilize the fraudster computing environment 160 to gain access to and decrypt the data 130 as described above.

In one embodiment, the data management system 112 may provide data management services in relation to an external data store 180 that includes data 182 organized in data columns 184, as described in relation to the data store 114. The external data store 180 can include one or more data storage devices or facilities outside the direct control of the service provider computing environment 110. In one embodiment, all of the data 130 can be included in the data 182. In other words, the data management system 112 may manage data 130 that is stored in relation with virtual or physical storage that is not part of a service provider computing environment 110 associated with the data management system 112. Thus, the data management system 112 may manage the continuous and automatic re-encryption of the data 182 stored in the data store 180. In a manner similar to that described above. Some or all of the components of the data management system 112 that are shown as being within the service provider computing 110 can be implemented outside of the service provider computing environment 110 and may indeed be associated with third-party data management organizations or systems.

In one embodiment, the data management system 112 manages the data 130 in conjunction with a third-party cloud platform service provider 150 that provides cloud platform services the cloud platform service provider includes a cloud platform service provider such as Amazon Web Services (AWS), Microsoft Azure, Rackspace, Joyent, Google Cloud, or other cloud platform service providers. The data store can include data centers external to the data management system. The data management system 112 can work with the cloud platform service provider to manage the data in various external and internal data stores. In one embodiment, the data management system 112 utilizes the cloud platform service provider 150 to perform one or more of the functions involved in the process for continuously re-encrypt the data 130 or 182.

FIG. 2 is a representation of a portion of the data 130 stored in the data store 114 and organized into data columns 131a-131e, according to one embodiment. As set forth above, the data 130 can be organized in data columns 131. In the example of FIG. 2, there are five data columns 131a-131e. Each data column 131a-e includes data entries of particular category or data type. Each data column includes an entry for each user. A row of data includes data for a particular user in each category or data type.

A first data column 131a includes the given names of the users. A second data column 131b includes Social Security numbers of users. A third data column 131c includes mailing addresses of the users. A fourth data column 131d includes income data of the users. A fifth data column 131e includes dates of birth of the users. While FIG. 2 shows five data columns 131a-131e including data entries for nine users, in practice, the data 130 may include hundreds of data columns 131 each having data entries for millions of users. The data 130 can have data columns 131 for other categories such as a marital status of the user, an employer identification number of the user, a number of children of the user, a ZIP Code of the user, investment data of the user, banking data of the user, credit card data of the user, home ownership data of the user, real estate holdings data of the user, and other types of data.

If a fraudster was able to gain access to all of the data related to an individual user, the fraudster would be able to exploit the data in a way that can be very harmful to the user and to the data management system 112. For this reason, the data management system 112 organizes the data 130 into data columns 131 and encrypts each of the data columns 131 with differing encryptions. Thus, if a fraudster gains access to the data 130 and desires to obtain the data 130 in an exploitable form, the fraudster will need to break the encryption on multiple data columns 131. Furthermore, the data management system 112 continuously and automatically re-encrypts each of the data columns 131 to inhibit the fraudster from being able to break the encryption on even a single data column 131 before re-encryption occurs.

In FIG. 2 each of the data entries are represented by an "x", indicating that the data entries are encrypted.

As noted above, the specific illustrative examples discussed above are but illustrative examples of implementations of embodiments of the method or process for automatically and continuously re-encrypting data in a data store. Those of skill in the art will readily recognize that other implementations and embodiments are possible. Therefore, the discussion above should not be construed as a limitation on the claims provided below.

Process

Figure 3:
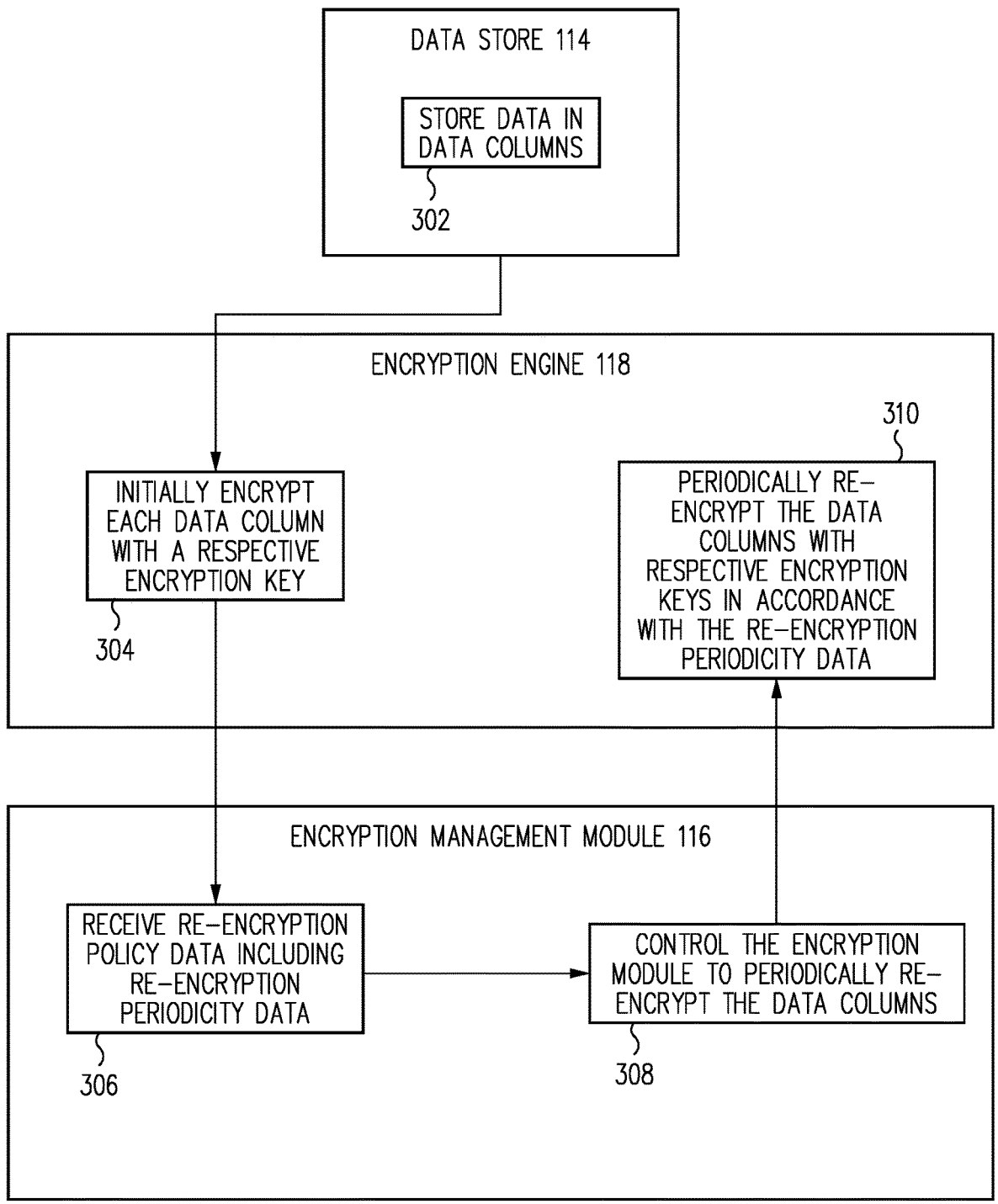
FIG. 3 is a block diagram of a process for automatically and continuously re-encrypting data in a data store in accordance with one embodiment.

FIG. 3 illustrates a functional flow diagram of a process 300 for providing automatic and continuous re-encryption of data in a data store, in accordance with one embodiment.

At block 302, the data store 114 stores data in data columns, according to one embodiment. From block 302 the process proceeds to block 304.

At block 304, the encryption engine 118 initially encrypts each data column in the data store 114 with a respective encryption key, according to one embodiment. The encryption engine 118 can initially encrypt the data columns as the data is written to the data store 114, according to one embodiment. From block 304 the process proceeds to block 306.

At block 306 the encryption management module 116 receives re-encryption policy data including re-encryption periodicity data defining a periodicity for automatically and periodically re-encrypting the data columns in the data store 114, according to one embodiment. From block 306 the process proceeds to block 308.

At block 308, the encryption management module 116 controls the encryption module 118 to periodically re-encrypt the data columns in the data store 114, according to one embodiment. From block 308 the process proceeds to block 310.

At block 310, the encryption engine 118 periodically re-encrypts the data columns with respective encryption keys in accordance with the re-encryption periodicity data, in accordance with the re-encryption periodicity data, according to one embodiment.

Although a particular sequence is described herein for the execution of the process 300, other sequences can also be implemented in accordance with principles of the present disclosure.

Figure 4:
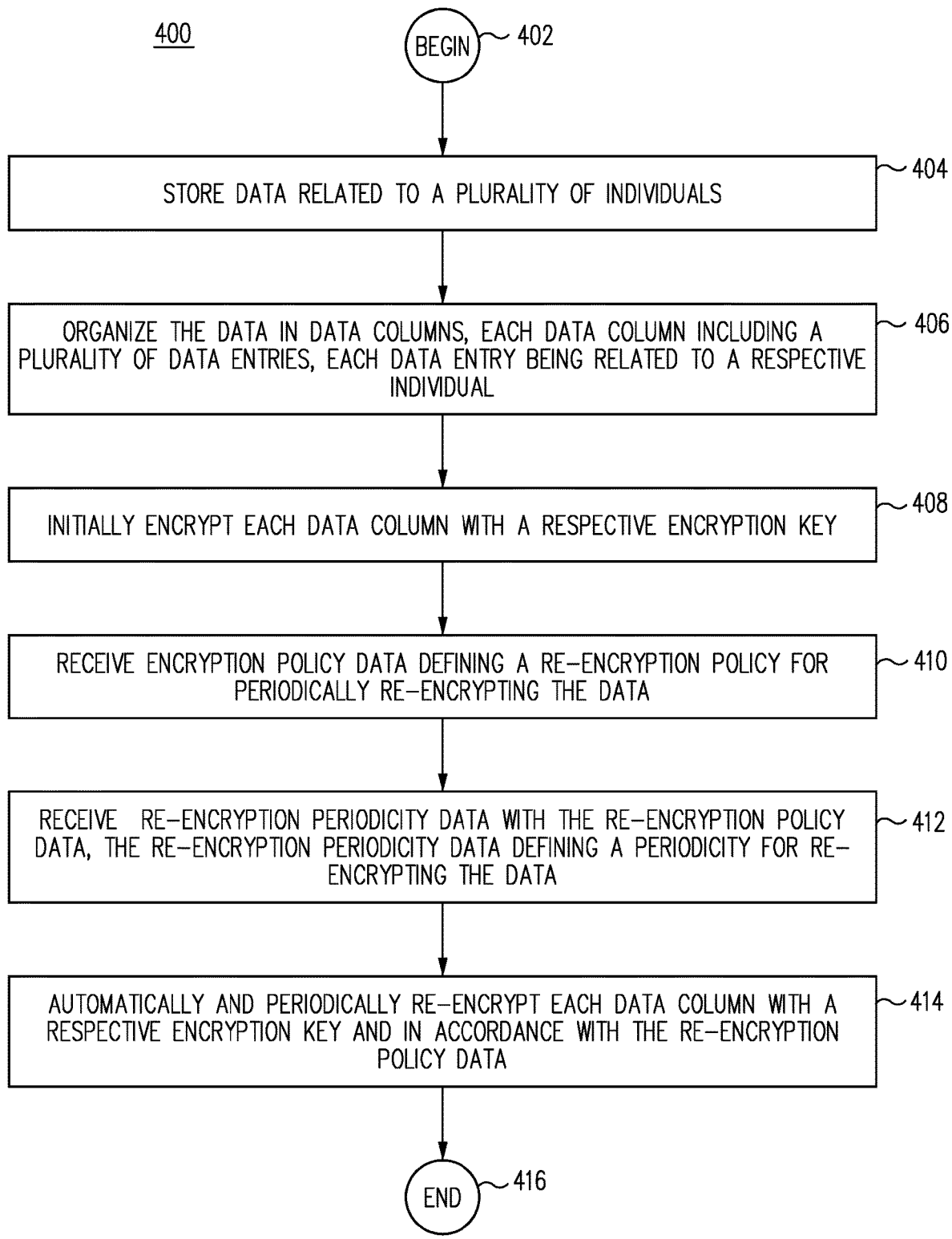
FIG. 4 is a flow chart diagram of a process for automatically and continuously re-encrypting data in a data store in accordance with one embodiment.

FIG. 4 illustrates a flow diagram of a process 400 for providing automatic and continuous re-encryption of data in a data store, according to various embodiments.

In one embodiment, process 400 for providing automatic and continuous re-encryption of data in a data store begins at BEGIN 402 and process flow proceeds to STORE DATA RELATED TO A PLURALITY OF INDIVIDUALS 404.

In one embodiment, at STORE DATA RELATED TO A PLURALITY OF INDIVIDUALS 404 process 400 for providing automatic and continuous re-encryption of data in a data store stores data related to a plurality of individuals.

In one embodiment, once process 400 for providing automatic and continuous re-encryption of data in a data store stores data related to a plurality of individuals at STORE DATA RELATED TO A PLURALITY OF INDIVIDUALS 404 process flow proceeds to ORGANIZE THE DATA IN DATA COLUMNS, EACH DATA COLUMN INCLUDING A PLURALITY OF DATA ENTRIES, EACH DATA ENTRY BEING RELATED TO A RESPECTIVE INDIVIDUAL 406.

In one embodiment, at ORGANIZE THE DATA IN DATA COLUMNS, EACH DATA COLUMN INCLUDING A PLURALITY OF DATA ENTRIES, EACH DATA ENTRY BEING RELATED TO A RESPECTIVE INDIVIDUAL 406, process 400 for providing automatic and continuous re-encryption of data in a data store organizes the data in data columns, each data column including a plurality of data entries, each data entry being related to a respective individual.

In one embodiment, once process 400 for providing automatic and continuous re-encryption of data in a data store organizes the data in data columns, each data column including a plurality of data entries, each data entry being related to a respective individual at ORGANIZE THE DATA IN DATA COLUMNS, EACH DATA COLUMN INCLUDING A PLURALITY OF DATA ENTRIES, EACH DATA ENTRY BEING RELATED TO A RESPECTIVE INDIVIDUAL 406, process flow proceeds to INITIALLY ENCRYPT EACH DATA COLUMN WITH A RESPECTIVE ENCRYPTION KEY 408.

In one embodiment, at INITIALLY ENCRYPT EACH DATA COLUMN WITH A RESPECTIVE ENCRYPTION KEY 408, process 400 for providing automatic and continuous re-encryption of data in a data store initially encrypts each data column with a respective encryption key.

In one embodiment, once process 400 for providing automatic and continuous re-encryption of data in a data store initially encrypts each data column with a respective encryption key at INITIALLY ENCRYPT EACH DATA COLUMN WITH A RESPECTIVE ENCRYPTION KEY 408, process flow proceeds to RECEIVE ENCRYPTION POLICY DATA DEFINING A RE-ENCRYPTION POLICY FOR PERIODICALLY RE-ENCRYPTING THE DATA 410.

In one embodiment, at RECEIVE ENCRYPTION POLICY DATA DEFINING A RE-ENCRYPTION POLICY FOR PERIODICALLY RE-ENCRYPTING THE DATA 410 the process 400 receives encryption policy data defining a re-encryption policy for periodically re-encrypting the data.

In one embodiment, once process 400 receives encryption policy data defining a re-encryption policy for periodically re-encrypting the data at RECEIVE ENCRYPTION POLICY DATA DEFINING A RE-ENCRYPTION POLICY FOR PERIODICALLY RE-ENCRYPTING THE DATA 410, process flow proceeds to RECEIVE RE-ENCRYPTION PERIODICITY DATA WITH THE RE-ENCRYPTION POLICY DATA, THE RE-ENCRYPTION PERIODICITY DATA DEFINING A PERIODICITY FOR RE-ENCRYPTING THE DATA 412.

In one embodiment, at RECEIVE RE-ENCRYPTION PERIODICITY DATA WITH THE RE-ENCRYPTION POLICY DATA, THE RE-ENCRYPTION PERIODICITY DATA DEFINING A PERIODICITY FOR RE-ENCRYPTING THE DATA 412 the process 400 for providing automatic and continuous re-encryption of data in a data store receives re-encryption periodicity data with the re-encryption policy data, the re-encryption periodicity data defining a periodicity for re-encrypting the data.

In one embodiment, once the process 400 for providing automatic and continuous re-encryption of data in a data store receives re-encryption periodicity data with the re-encryption policy data, the re-encryption periodicity data defining a periodicity for re-encrypting the data at RECEIVE RE-ENCRYPTION PERIODICITY DATA WITH THE RE-ENCRYPTION POLICY DATA, THE RE-ENCRYPTION PERIODICITY DATA DEFINING A PERIODICITY FOR RE-ENCRYPTING THE DATA 412, process flow proceeds to AUTOMATICALLY AND PERIODICALLY RE-ENCRYPT EACH DATA COLUMN WITH A RESPECTIVE ENCRYPTION KEY AND IN ACCORDANCE WITH THE RE-ENCRYPTION POLICY DATA 414.

In one embodiment, at AUTOMATICALLY AND PERIODICALLY RE-ENCRYPT EACH DATA COLUMN WITH A RESPECTIVE ENCRYPTION KEY AND IN ACCORDANCE WITH THE RE-ENCRYPTION POLICY DATA 414 the process 400 for providing automatic and continuous re-encryption of data in a data store automatically and periodically re-encrypts each data column with a respective encryption key and in accordance with the re-encryption policy data.

In one embodiment, once the process 400 for providing automatic and continuous re-encryption of data in a data store automatically and periodically re-encrypts each data column with a respective encryption key and in accordance with the re-encryption policy data at AUTOMATICALLY AND PERIODICALLY RE-ENCRYPT EACH DATA COLUMN WITH A RESPECTIVE ENCRYPTION KEY AND IN ACCORDANCE WITH THE RE-ENCRYPTION POLICY DATA 414, process flow proceeds to END 416.

In one embodiment, a method for automatically and continuously re-encrypting data in a data store includes storing data related to a plurality of individuals and organizing the data in data columns. Each data column includes a plurality of data entries. Each data entry is related to a respective individual. The method also includes initially encrypting each data column with a respective encryption key, receiving encryption policy data defining a re-encryption policy for periodically re-encrypting the data, and receiving re-encryption periodicity data with the re-encryption policy data. The re-encryption periodicity data defines a periodicity for re-encrypting the data. The method also includes automatically and periodically re-encrypting each data column with a respective encryption key and in accordance with the re-encryption policy data.

In one embodiment, a non-transitory computer-readable medium has a plurality of computer-executable instructions which, when executed by a processor, perform a method for automatically and continuously re-encrypting data in a data store. The instructions include a data store configured to store data in data columns each including a respective data type. The data is related to a plurality of individuals. The instructions include an encryption engine configured to encrypt each data column with a respective encryption key. The instructions also include an encryption policy control module configured to receive re-encryption policy data including re-encryption periodicity data defining a periodicity for re-encrypting the data columns. The instructions also include an encryption management module configured to receive the re-encryption policy data from the encryption policy control module and to cause the re-encryption engine to automatically periodically re-encrypt the data columns with the periodicity defined by the re-encryption periodicity data.

In one embodiment, a system for automatically and continuously re-encrypting data in a data store includes at least one processor and at least one memory coupled to the at least one processor. The at least one memory has stored therein instructions which, when executed by any set of the one or more processors, perform a process for automatically and continuously re-encrypting data in a data store. The process includes storing data related to a plurality of individuals and organizing the data in data columns. Each data column includes a plurality of data entries. Each data entry is related to a respective individual. The process also includes initially encrypting each data column with a respective encryption key and receiving encryption policy data defining a re-encryption policy for periodically re-encrypting the data. The process also includes receiving re-encryption periodicity data with the re-encryption policy data. The re-encryption periodicity data defines a periodicity for re-encrypting the data. The process also includes automatically and periodically re-encrypting each data column with a respective encryption key and in accordance with the re-encryption policy data.

In the discussion above, certain aspects of one embodiment include process steps, operations, or instructions described herein for illustrative purposes in a particular order or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for automatically and continuously re-encrypting data in a data store, the system comprising:
    at least one processor; and
    at least one memory coupled to the at least one processor, the at least one memory having stored therein instructions which when executed by any set of the one or more processors, cause the system to perform operations including:
        storing data related to a plurality of individuals;
        organizing the data in data columns, each data column including a plurality of data entries, each data entry being related to a respective individual, wherein each data column is associated with a respective data type and the data entries of the data column correspond to the respective data type;
        encrypting each data column with an initial encryption key, wherein each initial encryption key is different than the other initial encryption keys;
        defining a re-encryption period for periodically re-encrypting the data columns;
        defining a staggered time for re-encrypting each of the data columns within the re-encryption period, wherein each staggered time is different than the other staggered times; and
        automatically and periodically re-encrypting each respective data column with a unique encryption key and at the respective data column's defined staggered time within the re-encryption period.

2. The system of claim 1, wherein the data types include at least one of a user name, a date of birth, a government identification, a home address, a zip code, a home ownership status, a marital status, an income, a tax refund, a tax liability, a tax return, a job title, an employer, a tax deduction, a tax withholding, a retirement plan, a dependent child, a spouse, a financial asset, or a medical history.

3. The system of claim 2, wherein the data types are related to finance.

4. The system of claim 3, wherein the plurality of individuals are users of the system.

5. The system of claim 4, wherein the system manages financial data for the plurality of individuals.

6. The system of claim 3, wherein the system includes at least one of a tax return preparation system, a payroll management system, a budgeting system, a book keeping system, or a financial transaction monitoring system.

7. The system of claim 1, wherein re-encrypting each respective data column includes:
    decrypting the respective data column with a prior encryption key associated with a most recent prior encryption of the respective data column;
    generating a new encryption key for the respective data column; and
    rewriting the respective data column to a data store with the new encryption key.

8. The system of claim 7, wherein the new encryption key includes multiple new encryption keys.

9. The system of claim 1, wherein the re-encryption period indicates a maximum period of time that can elapse between re-encryption cycles.

10. The system of claim 9, wherein the re-encryption period is less than three months.

11. The system of claim 9, wherein the re-encryption period is less than one month.

12. The system of claim 9, wherein the re-encryption period is less than two weeks.

13. The system of claim 9, wherein the re-encryption period is less than one week.

14. The system of claim 9, wherein the re-encryption period is less than 24 hours.

15. The system of claim 1, wherein storing the data related to the plurality of individuals includes interfacing with a cloud platform service provider.

16. A method comprising:
    storing data related to a plurality of individuals;
    organizing the data in data columns, each data column including a plurality of data entries, each data entry being related to a respective individual, wherein each data column is associated with a respective data type and the data entries of the data column correspond to the respective data type;
    encrypting each data column with an initial encryption key, wherein each initial encryption key is different than the other initial encryption keys;
    defining a re-encryption period for periodically re-encrypting the data columns;
    defining a staggered time for re-encrypting each of the data columns within the re-encryption period, wherein each staggered time is different than the other staggered times; and
    automatically and periodically re-encrypting each respective data column with a unique encryption key and at the respective data column's defined staggered time within the re-encryption period.

17. The method of claim 16, wherein the data types include at least one of a user name, a date of birth, a government identification, a home address, a zip code, a home ownership status, a marital status, an income, a tax refund, a tax liability, a tax return, a job title, an employer, a tax deduction, a tax withholding, a retirement plan, a dependent child, a spouse, a financial asset, or a medical history.

18. The method of claim 16, wherein the data types are related to finance.

19. The method of claim 18, wherein the plurality of individuals are users of the system.

20. The method of claim 18, wherein the system manages financial data for the plurality of individuals.

21. The method of claim 18, wherein the system includes at least one of a tax return preparation system, a payroll management system, a budgeting system, a book keeping system, or a financial transaction monitoring system.

22. The method of claim 16, wherein re-encrypting each respective data column includes:
    decrypting the respective data column with a prior encryption key associated with a most recent prior encryption of the respective data column;
    generating a new encryption key for the respective data column; and rewriting the respective data column to a data store with the new encryption key.

23. The method of claim 16, wherein the re-encryption period indicates a maximum period of time that can elapse between re-encryption cycles.

\* \* \* \* \*